United States Patent [19]
Konno

[11] Patent Number: 5,825,404
[45] Date of Patent: Oct. 20, 1998

[54] FLAW RECOVERING APPARATUS FOR OPTICAL RECORDING MEDIUM

[75] Inventor: Osamu Konno, Iruma, Japan

[73] Assignee: Olympus Optical Co., Ltd., Tokyo, Japan

[21] Appl. No.: 464,127

[22] Filed: Jun. 5, 1995

[30] Foreign Application Priority Data

Jun. 9, 1994 [JP] Japan .................................. 6-127625

[51] Int. Cl.⁶ .......................... B41J 2/435; G01D 15/24; H01S 1/131; G11B 7/00
[52] U.S. Cl. ................... 347/262; 346/33 F; 346/33 A; 346/74.2
[58] Field of Search .................. 347/256, 262, 347/84, 85; 346/33 F, 33 A, 74.2, 133

[56] References Cited

U.S. PATENT DOCUMENTS

| | | |
|---|---|---|
| 4,922,351 | 5/1990 | Suzuki et al. ............................ 358/494 |
| 5,424,813 | 6/1995 | Schlueter, Jr. et al. ................. 399/239 |
| 5,457,012 | 10/1995 | Nair et al. ............................ 430/495.1 |

FOREIGN PATENT DOCUMENTS

| | | |
|---|---|---|
| 61-280086 | 12/1986 | Japan . |
| 63-106947 | 5/1988 | Japan . |
| 63-117349 | 5/1988 | Japan . |
| 2-89240 | 3/1990 | Japan . |
| 5-8494 | 2/1993 | Japan . |

Primary Examiner—Benjamin R. Fuller
Assistant Examiner—Raquel Yvette Gordon
Attorney, Agent, or Firm—Frishauf, Holtz, Goodman, Langer & Chick

[57] ABSTRACT

A flaw recovering apparatus for an optical recording medium comprising a liquid tank for applying refractive index matching liquid onto a recording surface of an optical card to form a refractive index matching liquid layer, a liquid applying roller, a film cassette for forming a transparent film layer on the index matching layer, and a film adhering roller.

24 Claims, 8 Drawing Sheets

FLAW RECOVERING APPARATUS FOR OPTICAL RECORDING MEDIUM

BACKGROUND OF THE INVENTION

1. Field of the Invention

The present invention relates to a flaw recovering apparatus for an optical recording medium and more particularly to a flaw recovering apparatus to be used to read recorded information without making errors.

2. Description of the Related Art

An optical card for practical use, serving as an optical data recording medium having a size of well-known magnetic card and a large capacity, has been advanced. Such an optical card is an optical data recording medium in which data is recorded/reproduced by an optical beam. As types of optical data recording medium, there are used a ROM (Read Only Memory) type, a WORM (Write Once Read Many, and a rewriting type.

Moreover, as an example of data recording method, there are a method in which a pit is formed by providing irradiation of a laser beam onto the optical recording medium, a method in which data recording is performed by use of a change of reflectance, which is caused by a thermal deformation or a change of phase, and an optical magnetic recording using an optical magnetic effect.

Figure 10A:
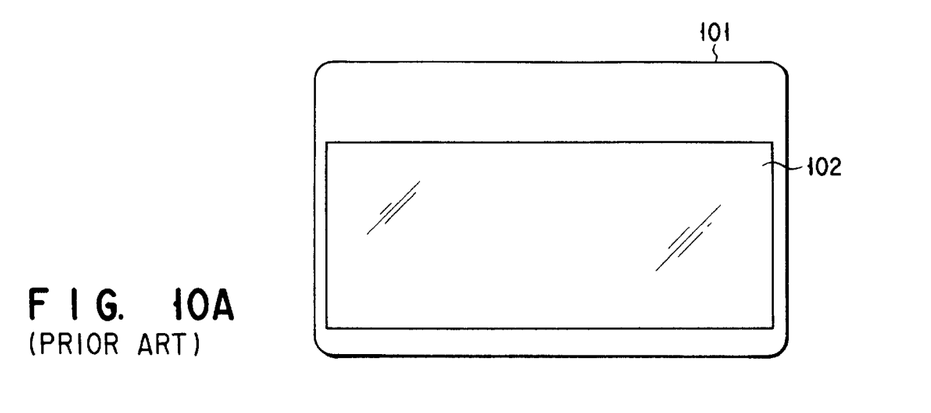
FIG. 10A is a view explaining the optical card in a case that an optical recording area has a normal size.
Figure 10B:
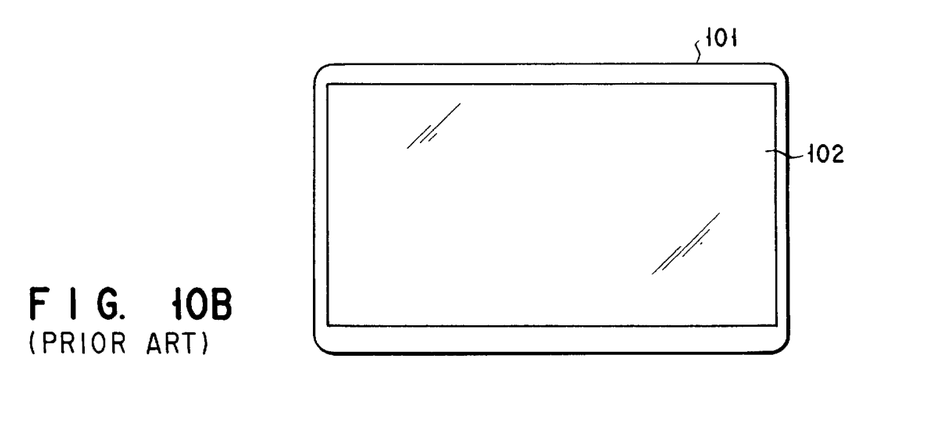
FIG. 10B is a view explaining the optical card in a case a storage capacity becomes large.

FIG. 10A shows a typical structure of an optical card 101. The size of the optical card is 54×86×0.76 mm, which is the same as a normal credit card. The size in a vertical direction of an optical recording area of the optical 101 is 30 mm, and its recording capacity is about 3M bytes. The wider the width of the optical recording area of the optical card is, the more the recording capacity is increased. Due to this, in recent years, there has been proposed an optical card of FIG. 10B, serving as a standard, in which substantially the entire surface of the optical card is used as an optical recording area so as to obtain a large recording capacity. The optical card 101 has an optical recording medium section 102.

Figure 11:
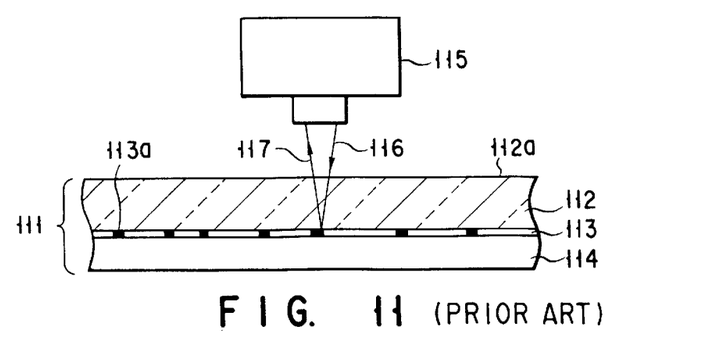
FIG. 11 is a view explaining a conventional data recording/reproducing method for an optical card.

FIG. 11 shows one example of a conventional data recording/reproducing method for an optical card. An optical card 111 comprises a transparent protection layer 112, an optical recording layer 113 formed on a back surface of the transparent protection layer 112, a backing layer 114 formed on a back surface of the optical recording layer 113, and a recording pit 113a formed in the optical recording layer 113 to be recorded in accordance with data. An incident light 116 sent from an optical system 115 is transmitted through a smooth surface 112a of the transparent protection layer 112, reaches the optical recording layer 113, and is reflected or absorbed by presence of the recording pit 113a recorded in the optical recording layer 113. A reflected light 117 is transmitted through the transparent protection layer 112, received by the optical system 115, and read as recording data by an optical card reader/writer including the optical system 115. Also, in the case of recording, an output of the incident light 116 is enhanced in accordance with recording data, and a recording pit is formed in the optical recording layer 113, thereby recording data.

As advantages of the optical card, there are good portability, a large capacity, a low bit unit cost, and strong against static electricity. As a disadvantage, the optical card is weak against flaws and dirty. If there are flaws and dirty in the optical card, data reading becomes unstable or data reading cannot be carried out.

Figure 12:
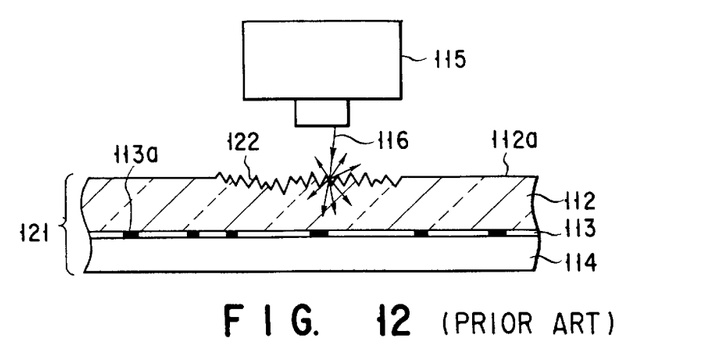
FIG. 12 is a view explaining a case that a flaw is formed on the surface layer of the optical card.

FIG. 12 shows an example of a case where a flaw is formed on the surface layer of the optical card. In FIG. 12, an optical card 121 is structured to sandwich the optical recording layer 113 having the recording pit 113a between the transparent protection layer 112 and the backing layer 114. In the above-structured optical card, if a flaw 122 is formed on a surface 112a of the transparent protection layer 112, the incident light 116 sent from the optical system 115 is scattered by the flaw 122 formed on the surface 112a of the transparent protection layer 112. Due to this, the incident light 116 does not reach the optical recording layer 113, and recorded data cannot be read. In other words, the flaw 122 hinders data from correctly being recorded/reproduced.

So far, several proposals have been made to deal with the disadvantage in which the optical card is weak against the flaw and dirty.

Figure 13A:
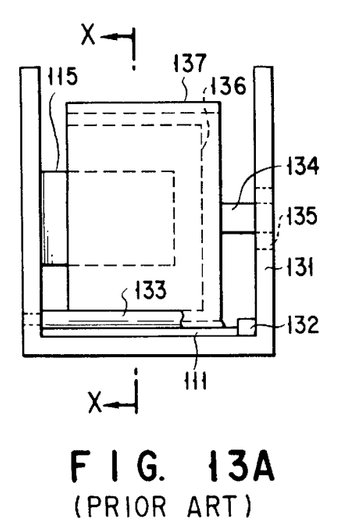
FIG. 13A is a front view explaining a reading mechanism in which a flaw portion is buried with soft transparent material.
Figure 13B:
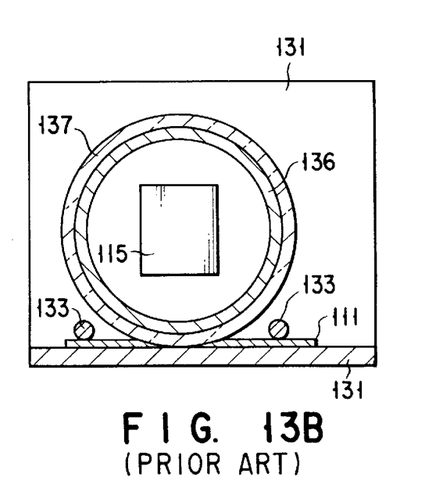
FIG. 13B is a cross sectional view taken along line X—X of FIG. 13.

FIGS. 13A and 13B are views showing a method of burying a flaw portion with a soft transparent material as disclosed In Japanese Patent Application KOKOKU Publication No. 5-8494. More specifically, FIG. 13A is a front view showing a reading mechanism, and FIG. 13B is a cross sectional view taken along line X—X of FIG. 13A. It is noted that the same reference numerals as FIG. 11 are added to the portions common to FIG. 11, and the explanation is omitted.

The reading mechanism of FIGS. 13A and 13B is structured such that the optical card 111 is fed along a bottom surface of a case 131 and recording data of the optical card 111 is read by a card reader including the optical system 115, which is fixed to a central portion of one side wall of the case 131. As the optical card 111 is being pressed to one side wall of the case 131 by a spring mechanism 132, the optical card 111 is sent in a predetermined direction of movement by card feeding rollers, which are provided at back and forth portions of the optical card 111 to be supported by the side wall. Thereby, the optical card 111 is prevented from being irregularly moved to the optical system 115. A rotational shaft 134 is fixed to a central portion of the other side wall through a bearing 135, and a closed end surface of a roller (rotational cylinder) 136 is connected to a top end of the rotational shaft 134. A layer 137 formed of a soft transparent material is formed on a peripheral portion of the roller 133.

Figure 14:
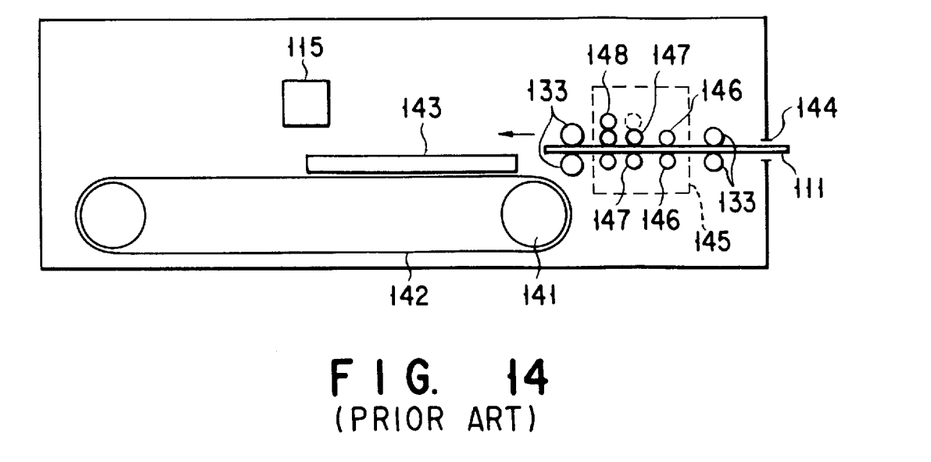
FIG. 14 is a view explaining an optical card recording/reproducing apparatus having means for applying refractive index matching liquid.

FIG. 14 shows an optical card recording/reproducing apparatus having means for applying index matching liquid onto the card as disclosed in Japanese Patent Application KOKAI Publication No. 61-280086. It is noted that the same reference numerals as FIGS. 11 and 13 are added to the portions common to FIG. 11, and the explanation is omitted.

In the optical card recording/reproducing apparatus of FIG. 14, a belt 142, which reciprocates through a pulley 141, is provided at a lower portion of the optical system 115. A card mount base 143 is provided on the belt 142. The card feeding rollers 133 are arranged at both ends of an optical card transferring path, which is provided between the belt 142 and an insertion port 144 through which the optical card 111 is inserted. An optical card cleaning unit 145 is provided between two card feeding rollers 133, 133. A roller 146 for collecting dirty, a roller 147 for application, and a roller 148 for wiping are arranged at upper and lower portions of the optical card 111 in order from the card insertion port 144 in the optical card cleaning unit 145.

Figure 15:
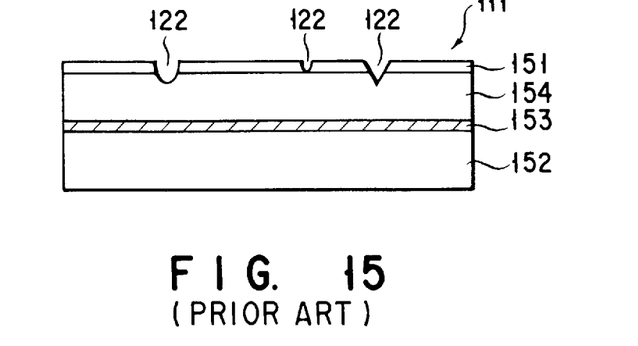
FIG. 15 is a schematic cross sectional view showing a state of a flaw formed on a hard coat layer of an optical card.
Figure 16:
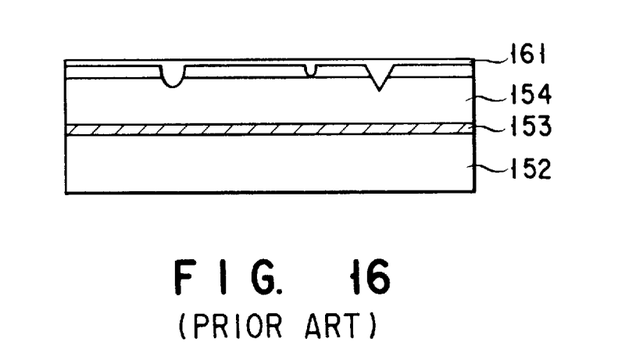
FIG. 16 is a schematic cross sectional view showing a method for recovering a flaw of FIG. 15.

FIGS. 15 and 16 are views each explaining a method for forming transparent resin having the same refractive index as the transparent base material as disclosed in Japanese Patent Application KOKAI Publication No. 63-106947. More specifically, FIG. 15 is a schematic cross sectional view showing a state of a flaw 122 formed on a hard coat layer 151 of the optical card 111, and the hard coat layer 151 is formed on a card base material 152 through an optical recording layer 153 and a transparent base material 154, sequentially. FIG. 16 is a schematic cross sectional view showing a method for recovering a flaw, and recovering layer 161 is formed on the hard coat layer 151.

Figure 17:
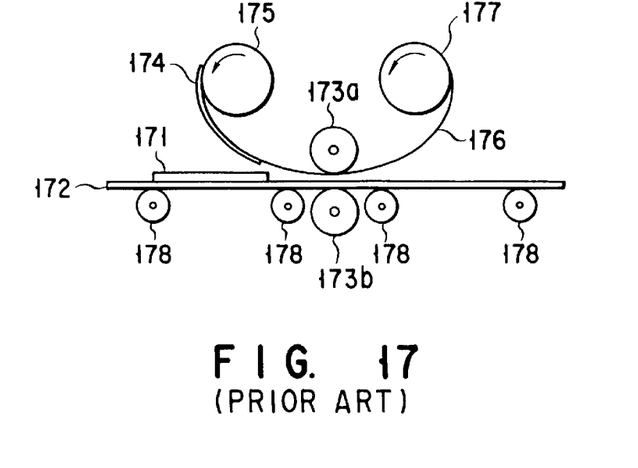
FIG. 17 is a schematic structural view showing a recovering apparatus used in the optical card flaw recovering method.

FIG. 17 is a schematic structural view showing one example of a recovering apparatus used in the optical card flaw recovering method as disclosed in Japanese Patent Application KOKAI Publication No. 63-117349. An optical card 171 having a flaw is mounted on a stage 172. Thermally pressuring rollers 173a and 173b are provided at upper and lower portions of the stage 171, respectively. A paper supply roller 175 around which a thin film 174, formed of thermally plastic adhesive, is wound, and a winding roller 177 for winding a separation type paper from the thin film 174 after passing between the thermally pressing rollers 173a and 173b are provided at an upper portions of the stage 171. A card feeding roller 178 is provided at a lower portion of the stage 171.

Figure 18A:
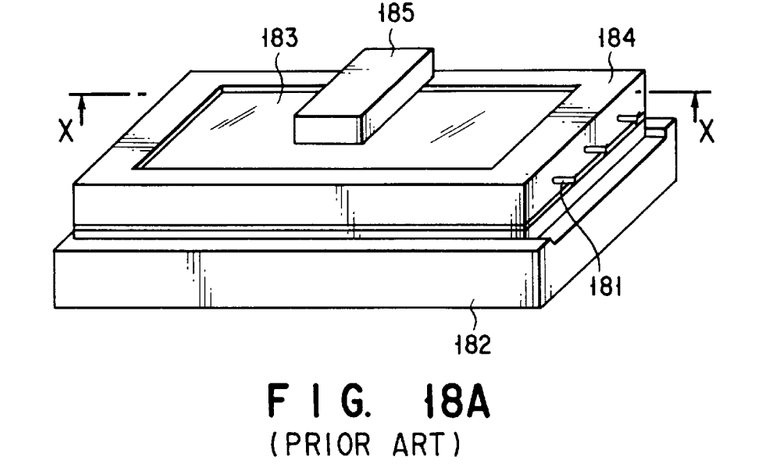
FIG. 18A is a perspective view of an optical reading/reproducing apparatus which performs reading by inserting a card to a tank structure.
Figure 18B:
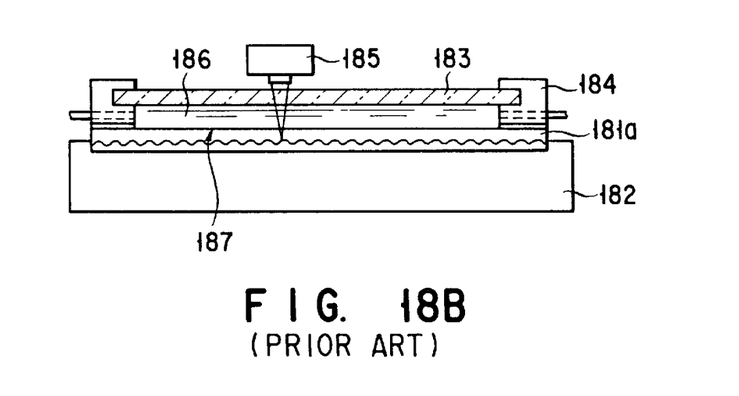
FIG. 18B is a cross sectional view taken along line X—X of FIG. 18A.

FIGS. 18A and 18B are views each explaining an optical recording/reproducing apparatus as disclosed in Japanese Patent Application KOKAI Publication No. 2-89240. More specifically, FIG. 18A is a perspective view of the apparatus, and FIG. 18B is a cross sectional view taken along line X—X of FIG. 18A. FIGS. 18A and 18B will be briefly explained as follows.

An optical card 181 is provided on a base 182. A metal frame 183 having a reading window 184 is fixed to a periphery of the upper surface portion of the optical card 181. The reading window 184 is formed of glass having the same refractive index as a protection layer 181a of the optical card 181 or a reflective index of an allowable range. An optical head 185 for emitting a recording or reproducing beam is provided on an upper portion of the reading window 184. A tank 187, which is filled with index matching liquid 186, is provided at a lower side of the of the reading window 183 at the inner side of the metallic frame 183.

In the above-structured optical recording/reproducing apparatus, the recording or reproducing beam light emitted from the optical head 185 is transmitted through the reading window 184 as being converged. Thereafter, the beam light is transmitted through the tank 187, which is filled with index matching liquid 186, and the projection layer 181a of the optical card 181, and image-formed on a recording medium surface 181b of the optical card 181, thereby writing or reading a data bit. In this case, even if a carved flaw is presented on the surface of the protection layer 181a, index matching liquid 186 permeates into the inside of the flaw, so that the flaw disappears seemingly and influence of the flaw is not seen.

However, in the above-mentioned prior art, there are problems as follows.

(1) Since the reading mechanism of FIG. 13 is structured such that the rotational cylinder 136 is used, the size of the apparatus is enlarged. In addition, if the apparatus is used for a long period of time, dirty is accumulated on the soft member, thereby making it difficult to carry out the optical reading.

(2) In the optical card recording/reproducing apparatus of FIG. 14, it is difficult to smooth the applied oil liquid surface in practical use.

(3) In the method of FIGS. 15 and 16, it takes much time to harden the recovering layer applied onto the surface where the flaw 122 is generated.

(4) In FIG. 17, the method for thermally pressurizing the thin film 174, formed of thermally plastic adhesive, through the separation type paper 176, has possibility that unfavorable influence may be exerted on the recording pit since the optical recording medium is heated.

(5) In the apparatus of FIG. 18, a special optical system and a complicated unit are needed since the apparatus of FIG. 18 is structured such that the card is introduced into the tank structure to perform the reading operation.

Moreover, in general, if the card is used for a long period time, the flaw and dirty are increased. Also, there is a case that t a warp is generated in the optical card if the card is portably held for a long period of time. Furthermore, there is case that a concave portion or a convex portion is partially formed on the optical card if the card is partially pressurized.

The prior art cannot sufficiently deal with the above-mentioned problems.

Also, the reader/writer for the optical card after recovering, which is normally used, not a special reader/writer, is desirable.

SUMMARY OF THE INVENTION

The present invention relates to a flaw recovering of an optical card, and object of the present invention is to provide a recovering apparatus for a flaw of an optical recording medium, which is easily readable even by a normal optical system or a normal reader/writer.

In order to attain the above object, there is provided a flaw recovering apparatus for an optical recording medium comprising first means for applying liquid material for matching refractive index onto a recording surface of an optical recording medium so as to form a first layer; and second means for overlaying a transparent plate-like member having flexibility on the first layer so as to form a second layer.

According to the present invention, the following matters can be used as liquid material for matching refractive index (refractive index matching liquid).

1. Refractive Index Liquid Series AAA made by R. P. Cargile Laboratories Inc (note: component: Perfluorocarbon and Chlorofuluorocarbon, refractive index: 1.300 to 2.11). Material to be used in the present invention is preferably selected from Series A (refractive index=1.460 to 1.640).

2. Diefuluoil made by Daikin Industries, Ltd (note: component: lower polymer of ethylene chloride trifluoride, which is monomer of fluoroethylene resin neofleon CTFE, refractive index: 1.397 to 1.414). Material to be used in the present invention is selected from this material.

3. Silicon series liquid (component: silicon series)

4. If the degree of the flaw formed on the card is low, the present invention is not limited to the above-motioned material, and liquid having refractive index close to a transparent layer of a card can be used.

According to the present invention, it is preferable that the thickness of the addition of the first and second layers be 40 $\mu$m or less. In other words, if the thickness exceeds 40 $\mu$m, optical aberration of the optical system for reading and writing data of the optical recording medium is worsened that recording/reproducing characteristics are deteriorated. That is, the design of aberration of the optical system is generally made such that a variation of the thickness, 0.4 mm, of the transparent projection layer of the optical card is set to ±10% (0.04 mm=40 $\mu$m). If the variation exceeds this value, the recording/reproducing characteristics may be deteriorated.

According to the present invention, a concave and convex portion, which is formed by a flaw formed on a surface of a transparent protection layer of an optical card, is buried with refractive index matching liquid having substantially the same refractive index as the transparent protection layer. Sequentially, a transparent sheet is mounted on the surface of refractive index matching liquid. Due to this, scattering of light does not occurs at the flaw portion, and the concave and convex portion of the surface of index matching liquid is made flat by the transparent sheet, thereby a correct optical reading can be performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Embodiments of the flaw recovering apparatus for an optical recording medium of the present invention will be explained with reference to the drawings.

EXAMPLE 1

Figure 1:
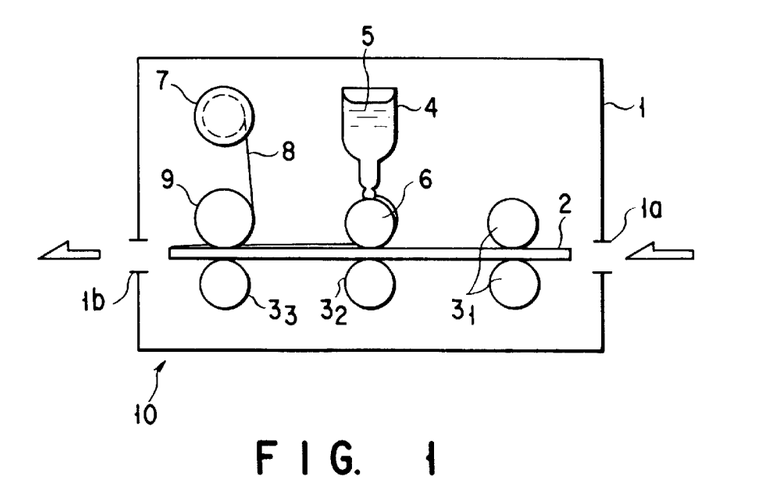
FIG. 1 is a view explaining a flaw recovering apparatus of an optical recording medium of Example 1 of the present invention.

In FIG. 1, a case 1 comprises a card insertion port 1a for inserting an optical card 2, and a card discharge port 1b for discharging the optical card 2. Card transferring rollers $3_1$, $3_2$, and $3_3$ are arranged in the case 1 between the card insertion port 1a and the card discharge port 1b. A liquid applying roller 6 is provided at an upper portion of the card transferring roller $3_2$ to be opposite to the card transferring roller $3_2$ so as to apply refractive index matching liquid 5 contained in a liquid tank 4 onto the optical card 2. A film adhering roller 9 is provided at an upper portion of the card transferring roller $3_3$ to be opposite to the card transferring roller $3_3$ so as to adhere a transparent film 8 from a film cassette 7 onto the optical card 2.

An operation of the above-mentioned flaw recovering apparatus 10 will be explained as follows.

If the optical card 2 having a flaw is inserted to the flaw recovering apparatus 10 from the card insertion port 1a, the card 2 is transferred to a position where index matching liquid is applied by the card transferring roller $3_1$. Then, index matching liquid 5 contained in the liquid tank 4 is applied onto the optical card 2 through the liquid applying roller 6. Moreover, the optical card 2 is transferred to a position where the transparent film is adhered by the card rollers $3_1$, $3_2$, $3_3$. Then, the transparent film 8 is adhered to the optical card 2 from the film cassette 7 by the film adhering roller 9. Finally, the card is discharged to the outside from the card discharge port 1b.

Figure 2:
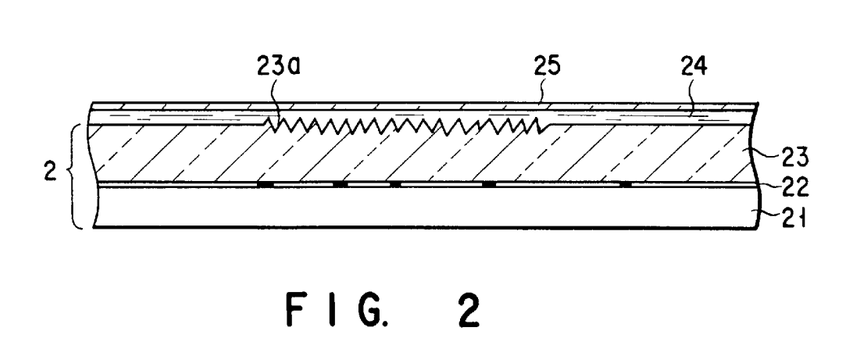
FIG. 2 is a view explaining an optical card having a flaw recovered by the flaw recovering apparatus of Example 1 of the present invention.

FIG. 2 shows a recovering state of the optical card 2 having a flaw obtained in Example 1.

The optical card 2 is structured such that an optical recording layer 22 formed on a backing layer 21, a transparent protection layer 23 having a flaw 23a, a refractive index matching liquid layer 24, and a transparent film 25 are layered in order. The transparent protection layer 23 is formed of polycarbonate having refractive index of 1.52. Refractive index matching liquid 5 whose refractive index is 1.52, which is the same as the transparent protection layer 23, is applied on the optical card 2, thereby forming the refractive index matching liquid layer 24, and the transparent film 25 is mounted thereon. The transparent film 25 is a polyimide film having a thickness of 25 μm and a low contraction. Since such a film is strong against expansion and contraction, the film is neither expanded nor contracted even if the film is thick. It is noted that a plate-like material such as polyester film may be used in place of polyimide film.

The thickness of the refractive index matching liquid layer 24 can be controlled to be about 10 μm by controlling an amount of liquid applying by use of the liquid applying roller 6. In other words, the thickness of the flaw recovering portion is about 40 μm or less.

On the other hand, the thickness of the transparent protection layer 23 is 0.4 mm, and the thickness of the flaw recovering portion is about 10% of the transparent protection layer 23.

Figure 3:
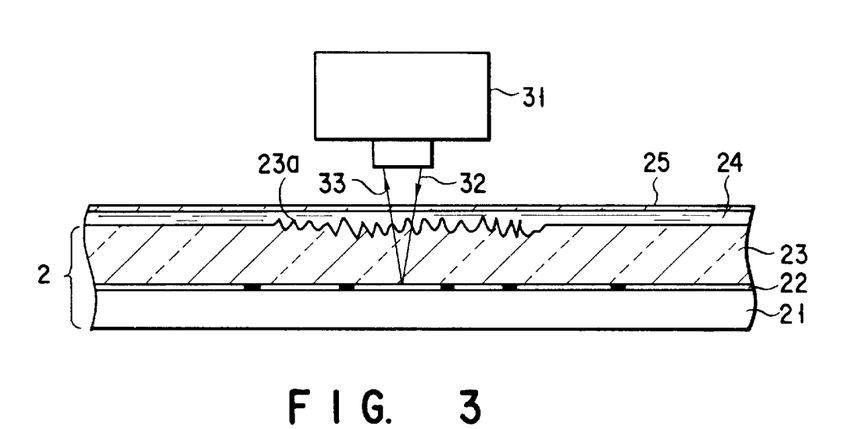
FIG. 3 is a view explaining a recording/reproducing state of data sent from the optical card whose flaw is recovered.

FIG. 3 is a schematic view showing a data recording/reproducing state from the optical card whose flaw is recovered. An incident light 32, which is emitted from the optical system 31, is transmitted through the transparent film 25, and introduced to the refractive index matching liquid layer 24, and a flaw 23a of the transparent protection layer 23. However, since the refractive index of the transparent protection layer 23 and that of the refractive index matching liquid layer 24 is substantially equal to each other, scattering of light, which is caused by the concave and convex portion of the flaw 23a, does not occur, and the incident light reaches the optical recording layer 22. Similarly, a reflected light 23, which is sent from the optical recording layer 22, is little influenced by the flaw 23a, and the light 23 is introduced to the optical system 31.

Moreover, regarding the thickness of the transparent, which is increased by the flaw recovery, since the total thickness of the transparent film 8 and the refractive index matching liquid layer 24 is about 40 μm, unfavorable influence is little exerted onto the data recording/reproducing. Therefore, according to the present invention, the optical card, which is recovered by the flaw recovering apparatus 10, can be inserted to the normal optical card reader/writer so that data can be recorded/reproduced.

Figure 4A:
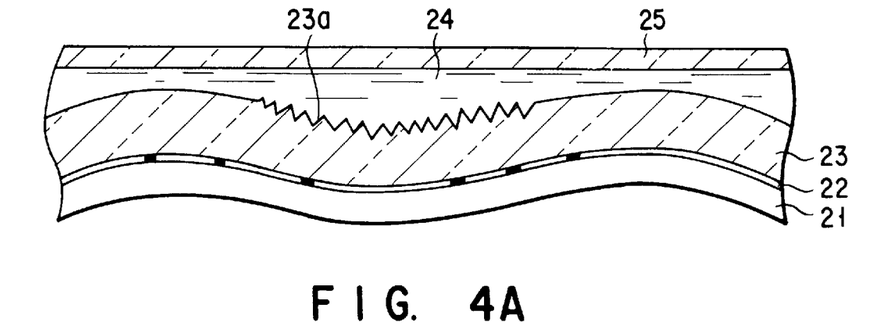
FIG. 4A is a view explaining a conventional optical card to which non-flexible film is adhered.
Figure 4B:
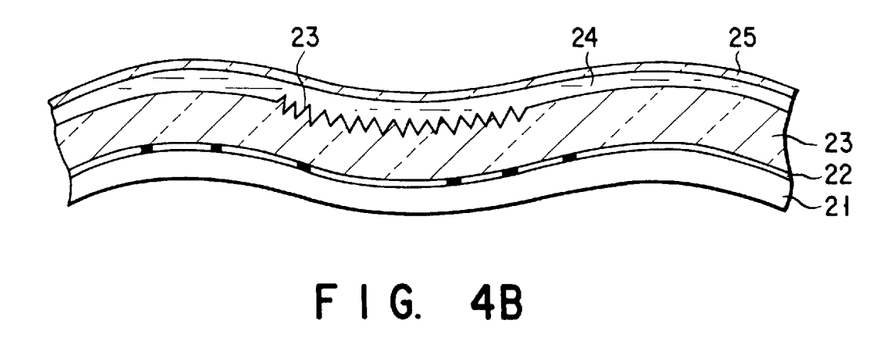
FIG. 4B is a view explaining a case after adhesion of the transparent film of the optical card having a warp, which is recovered by the flaw recovering apparatus of Example 1 of the present invention.

In the case that the warp is formed on the optical and as shown in FIG. 4A, the film can not follow the warp. However, in the case of this example, since the thin transparent film 8 whose thickness is 25 μm is used, the film can be adhered to the optical card as shown in FIG. 4B.

As mentioned above, the flaw recovering apparatus 10 of Example 1 comprises card transferring rollers $3_1$, $3_2$, and $3_3$ for transferring the optical card 2, a liquid applying roller 6 for applying refractive index matching liquid 5 contained in the liquid tank 4 onto the upper surface of the optical card 2 to form the refractive index matching liquid layer 24, and a film adhering roller 9 for adhering the transparent film 8, which is wound around the film cassette 7, onto the refractive index matching liquid layer 24. Therefore, regarding the flaw recovery, the index refractive matching liquid layer 24, which has substantially the same refractive index as the transparent protection layer 23 of the optical card 2, is formed on the surface of the optical card. Also, the flexible thin transparent protection layer 23 is added onto the refractive index matching liquid layer 24. Thereby, the flaw 23a is recovered and the correct optical reading can be performed.

Moreover, even if the warp is formed in the optical card 2, the transparent film 8 follows the warp of the optical card 2 and the partial variation of the thickness of the transparent layer can be controlled to a minimum since the refractive index matching liquid layer 24 and the transparent film 8 are flexible. Therefore, the correct reading can be performed even if the warp of the card is large.

EXAMPLE 2

Example 2 will be explained with reference to FIG. 5. In this case, the same reference numerals as FIGS. 1 and 3 are added to the members common to FIGS. 1 and 3, and the explanation is omitted. In a flaw recovering apparatus of Example 2, the mechanism of Example 1 is incorporated into an optical card reader/writer.

A card drive system 51 is a card drive system comprising a pulley 52 and a belt 53 reciprocates through the pulley 52. A card mount base 54 is attached onto the belt 53.

Similar to Example 1, refractive index matching liquid 5 is applied from the liquid tank 4 onto the optical card 2 having a flaw inserted from the card insertion port 1a, thereby forming the refractive index matching liquid layer. Further, the transparent film 8 is adhered thereto from the film cassette 7. Thereafter, in Example 2, for optical data recording/reproducing, the optical card 2 is first mounted on the card mount base 54, and reciprocates by the card drive system 51. The recording/reproducing of optical recording data is performed through the well-known optical head 31 including a semiconductor laser, an optical system for guiding a laser beam to a medium and extract reflected light, and a photodetector for detecting to reflected light. Since the optical head 31, the input/output system of the signal to the head 31, and the signal processing system have the well-known structure, the explanation will be omitted.

As mentioned above, the flaw recovering apparatus of Example 2 comprises the liquid tank 4 for applying refractive index matching liquid 5 onto the optical card 5, the pulley 52, the film cassette 7 for adhering the transparent film 8 onto the optical card 2, the card drive system 51 having the belt 53 reciprocates through the pulley 52, and the card mount base 54. Therefore, according to Example 2, the optical card 2 having a flaw can be recovered and data recording/reproducing can be performed at the same time.

EXAMPLE 3

Example 3 will be explained with reference to FIG. 6. In this case, the same reference numerals as FIGS. 1, 3, and 5 are added to the members common to FIGS. 1, 3, and 5, and the explanation is omitted. A flaw recovering apparatus of Example 3 is structured such that a normal optical card reader/writer is added to the apparatus of Example 2. The flaw recovering apparatus of Example 3 comprises a control section 61, a reissuing section 62, and a flaw recovering section 63.

In the above-structured apparatus, the optical card 2 having a flaw is inserted to the flaw recovering section 61 of the apparatus, recording data is read, and read data is sent to the reissuing section 62 through the control section 61. The reissuing section 62 transfers data to newly issued optical card 2.

As a transferring method, the following methods can be considered.

(1) Transferring all recording contents;

(2) Transferring only the necessary portions; and (3) Necessary minimum data is processed to be transferred.

Example 3 aims to transfer recording data to the card for reissuing from the optical card 2 having the flaw. Actually, in view of the practical use, there are often cases in which the card to which considerable flaws are added is reissued after transferring data to the new card in order to keep safety of data, and an individual desire of portability.

As mentioned above, in Example 3, the card having a flaw can be recovered, and at the same time, data can be transferred to the new card as required. Moreover, since the flaw recovering section 63 and the reissuing section 62 are provided and the reissuing and the recovering are performed at the same time, card issuing time can be reduced.

EXAMPLE 4

Example 4 will be explained with reference to FIG. 7. In this case, the same reference numerals as FIGS. 1, 3, and 5 are added to the members common to FIGS. 1, 3, and 5, and the explanation is omitted.

A blotting paper bobbin 71 feeds blotting paper 72 to the optical card 2 so as to absorb refractive index matching liquid, which is applied onto the optical card 2. A blotting paper collecting bobbin 73 is provided close to the blotting paper bobbin 71, and has a function of winding the used blotting paper 72. The card transferring rollers $3_3$ and $3_4$ are arranged in the case 1 between the card insertion port 1a and the card discharge port 1b.

In the above-structured flaw recovering apparatus, the process of applying the refractive index matching liquid onto the optical card 2 having a flaw and adhering the transparent film to the optical card 2 is the same as Example 1. However, after this process, there is provided a mechanism for absorbing refractive index matching liquid, which is applied to the optical card 2. The mechanism comprises the blotting paper bobbin 73, blotting paper 72, and the blotting paper collecting bobbin 73.

Figure 8A:
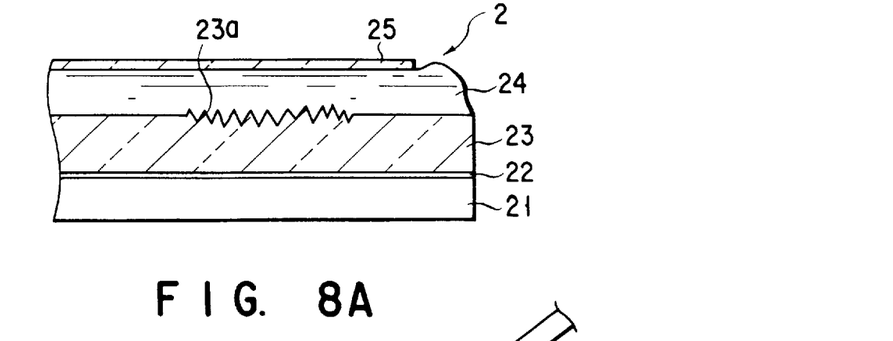
FIG. 8A is a view explaining a state that refractive index matching liquid is applied onto an optical card having a flaw and a transparent film is adhered thereon according to a flaw recovering apparatus of Example 4 of the present invention.
Figure 8B:
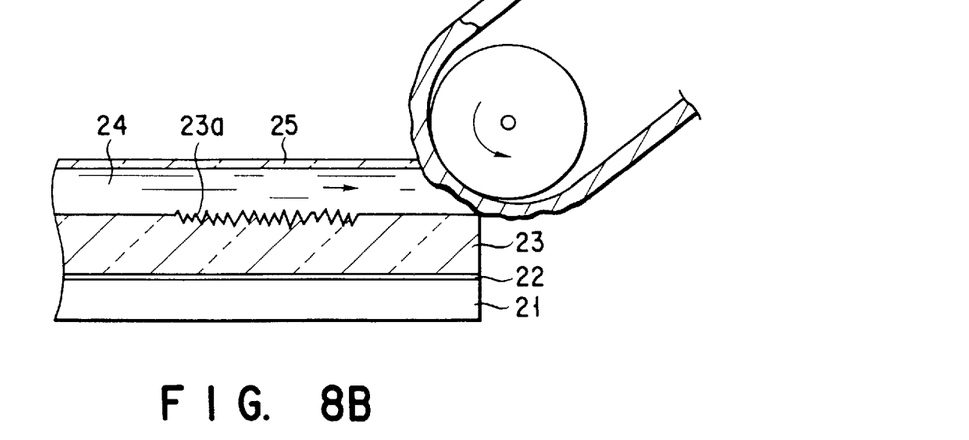
FIG. 8B is a view explaining a state that extra refractive index matching liquid is absorbed by blotting paper.
Figure 8C:
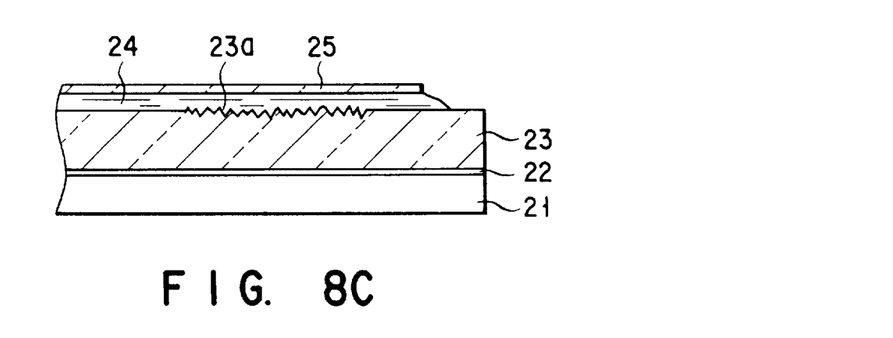
FIG. 8C is a view explaining a case after absorption of the extra refractive index matching liquid.

An operation of the above apparatus will be explained with reference to FIGS. 8A to 8C. FIG. 8A shows a state that refractive index matching liquid is applied to the optical card 2 having the flaw 23a, the refractive index matching liquid layer 24 is formed, and the transparent film 25 is adhered thereto. As shown in the figure, there may be a case that extra refractive index matching liquid is provided or the amount of liquid is large, and the thickness of the refractive index matching liquid layer 24 is too thick. If the liquid layer is thick, trouble may be easily generated in the optical system, or the film may be easily shifted. To take measures against these problems, in Example 4, liquid is absorbed by blotting paper 72 as shown in FIG. 8B. As a result, there can be provided a state that the liquid layer is thin and liquid does not overflow as shown in FIG. 8C.

EXAMPLE 5

Figure 9A:
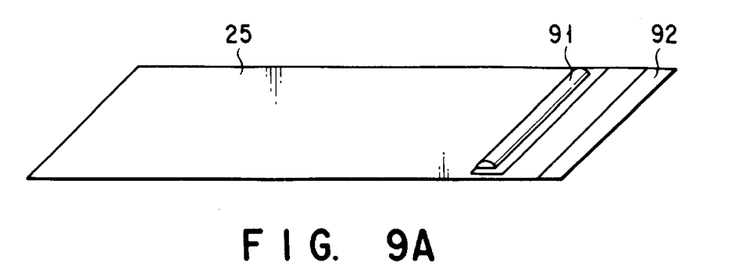
FIG. 9A is a view explaining a transparent film having refractive index matching liquid before rolling is performed by use of a roller of a flaw recovering apparatus of an optical recording medium of Example 5 of the present invention.
Figure 9B:
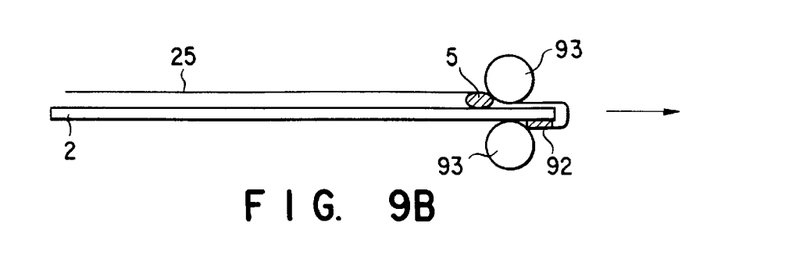
FIG. 9B is a view explaining the transparent film of FIG. 9A just before rolling is started.

Example 4 will be explained with reference to FIGS. 9A and 9B. FIG. 9A is a view explaining the transparent film having refractive index matching liquid 5 before rolling is performed by the rolling roller. FIG. 9B is a view explaining the optical card just before the transparent film of FIG. 9 is rolled. In this case, the same reference numerals as FIGS. 1 and 2 are added to the members common to FIGS. 1 and 2, and the explanation is omitted.

A holding bag 91 for refractive index matching liquid 5 is formed on one end portion along a longitudinal direction of the optical card 2 in a direction perpendicular to a longitudinal direction. An adhering section 92 is formed on one end portion along a longitudinal direction of the optical card 2 in a direction which is adjacent to the holding bag 91 and perpendicular to the longitudinal direction of the optical card 2. In FIG. 9B, a pair of upper and lower rolling rollers 92 and 93 are arranged on one end along a longitudinal direction of the optical card 2.

In Example 5, refractive index matching liquid 5 is held in an end portion of the transparent film 25 used to recover the optical card 2 having a flaw in advance as shown in FIG. 9A. At the time of recovering a flaw, the adhering section 92 is adhered to the backing surface of the optical card 2 having a flaw as shown in FIG. 9B, and refractive index matching liquid 5 is thinly and evenly distributed between the transparent film 25 on the optical card by the roller 93. The card may be pressed to be transferred by a hand or by rotating the roller 93.

According to Example 5, unlike the above-mentioned Examples, no complicated mechanism is needed, and the flaw recovering can be performed by a simple method.

In the above-mentioned Example 5, the thickness of the layer in which the first and second layers are added is preferably 40 $\mu$m or less. In other words, if the thickness exceeds 40 $\mu$m, optical aberration of the optical system for reading and writing data of the optical recording medium is worsened, and recording/reproducing characteristics are deteriorated. That is, the design of aberration of the optical system is generally made such that a variation of the thickness, 0.4 mm, of the transparent projection layer of the optical card is set to ±10% (0.04 mm=40 $\mu$m). If the variation exceeds this value, the recording/reproducing characteristics may be deteriorated. The present invention can be summarized as follows.

(1) As shown in FIG. 1, basically, the flaw recovering apparatus for an optical recording medium of the present invention comprises the card transferring rollers for transferring the optical card, the liquid applying roller for applying index matching liquid contained in the liquid tank onto the surface of the optical card to form the refractive index matching liquid layer, and the film adhering roller for forming the transparent film, which is wound around the film cassette, on the refractive index matching liquid layer. Therefore, regarding the flaw recovery, the refractive index matching liquid layer having substantially the same refractive index as the transparent protection layer of the optical card is formed on the surface of the optical card and the flexible thin transparent protection film is added onto the refractive index matching liquid layer. Thereby, the flaw can be recovered, and the correct optical reading can be performed. Also, even if there is the warp in the optical card, the correct reading can be performed.

Figure 5:
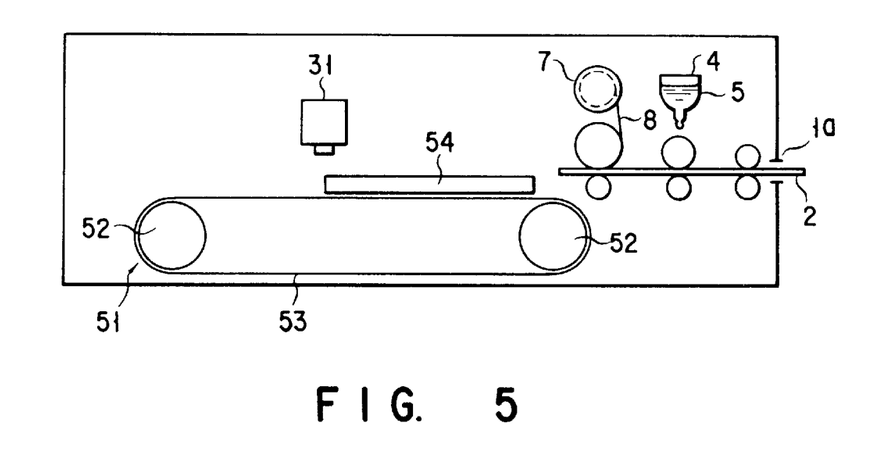
FIG. 5 is a view explaining a flaw recovering apparatus of an optical recording medium of Example 2 of the present invention.

(2) As shown in FIG. 5, the flaw recovering apparatus of the present invention may be an apparatus in which the mechanism of FIG. 1 is incorporated into the optical card reader/writer. In other words, such the apparatus comprises the liquid tank for applying refractive index matching liquid onto the optical card, the film cassette for adhering the transparent film onto the optical card, the pulley, the card drive system having the belt reciprocates through the pulley, and the card mount base. Therefore, according to such an apparatus, after the transparent film is adhered onto the refractive index matching liquid layer, the optical card is set onto the card mount base, reciprocated by the card drive system, and recording/reproducing of optical recording data can be performed through the optical system. Therefore, the optical card having the flaw can be recovered and the data recording/reproducing can be performed at the same time.

Figure 6:
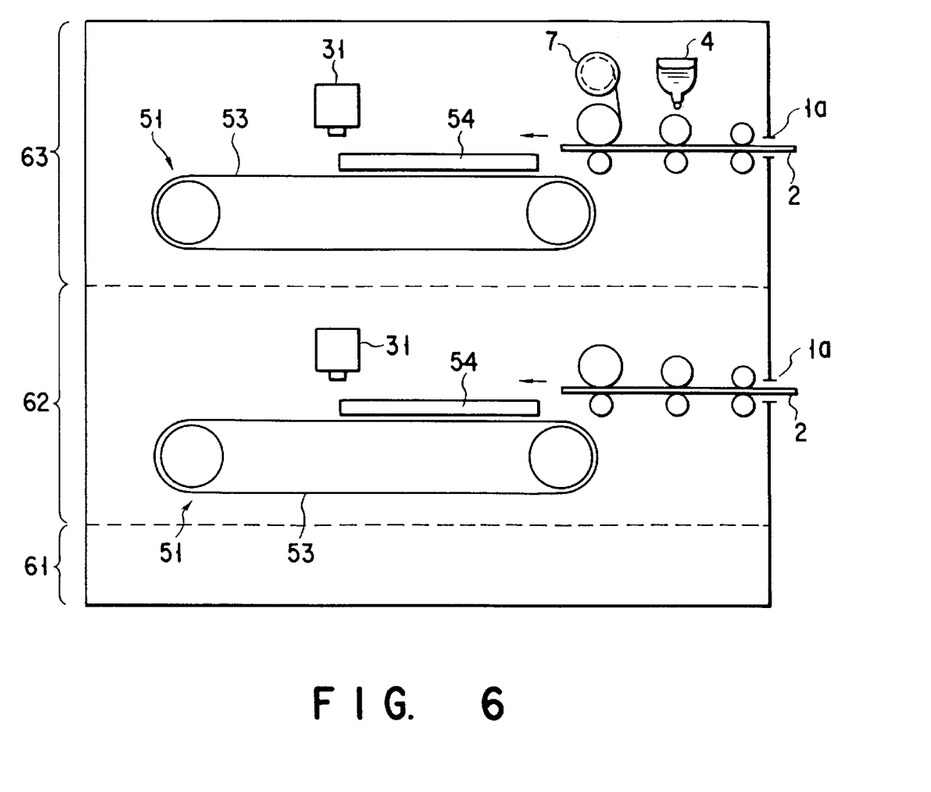
FIG. 6 is a view explaining a flaw recovering apparatus of an optical recording medium of Example 3 of the present invention.

(3) As shown in FIG. 6, the flaw recovering apparatus of the present invention is the apparatus in which the normal optical card reader/writer is added to the apparatus of FIG. 5. Such an apparatus may comprise the control section, the reissuing section, and the flaw recovering section. In the above-structured apparatus, the optical card having a flaw is inserted to the flaw recovering section of the apparatus, recording data is read, and read data is sent to the reissuing section through the control section. The reissuing section transfers data to newly issued optical card. Therefore, the card having the flaw can be recovered, and at the same time, data can be transferred to the new card as required. Moreover, since the flaw recovering section and the reissuing section are provided and the reissuing and the recovering are performed at the same time, card issuing time can be reduced.

Figure 7:
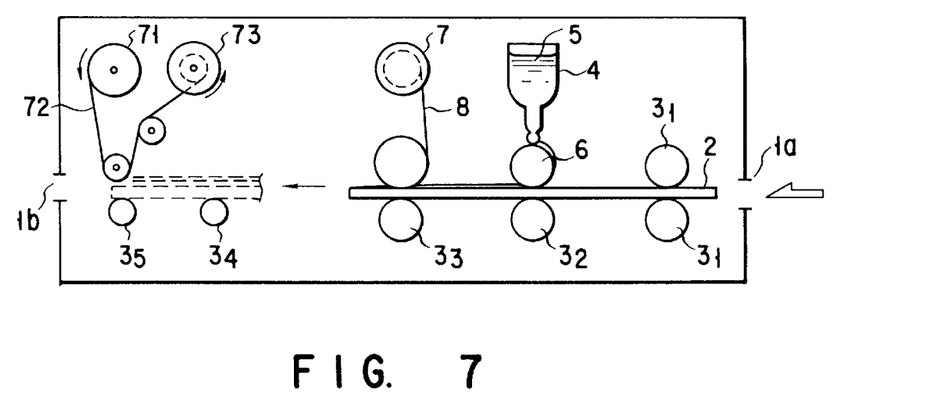
FIG. 7 is a view explaining a flaw recovering apparatus of an optical recording medium of Example 4 of the present invention.

(4) Further, as shown in FIG. 7, the flaw recovering apparatus of the present invention may be structured to have the blotting paper bobbin for feeding blotting paper to the optical card so as to absorb refractive index matching liquid, which is applied onto the optical card, and the blotting paper collecting bobbin for winding the used blotting paper. In the above-structured flaw recovering apparatus, there can be provided the flaw recovering state in which the refractive index matching liquid is applied onto the optical card having the flaw to form the refractive index matching liquid layer, and the liquid is absorbed by blotting paper after adhering the transparent film, the thickness of the liquid layer is made thin, and liquid does not overflow.

(5) Furthermore, as shown in FIG. 9, the flaw recovering apparatus of the present invention may be structured such that refractive index matching liquid is held on the end portion of the transparent film used to recover the optical card having the flaw, the adhering section is adhered to the back surface of the optical card having the flaw in advance, and refractive index matching liquid is thinly and evenly distributed between the optical card and the transparent film by the rolling roller. By such an structure, no complicated mechanism is needed, and the flaw can be recovered by a simple method.

As the flaw recovering apparatus for the optical recording medium of the present invention, the following specific forms can be considered.

(1) A flaw recovering apparatus for an optical recording medium, which is characterized by comprising removing means for removing liquid material;

(2) A flaw recovering apparatus for an optical recording medium, which is characterized in that a transparent plate-like member is a material having a low contraction;

(3) A flaw recovering apparatus for an optical recording medium, which is characterized in that a thickness of a layer where first and second layers are added is 40 μm or less; and (4) A flaw recovering apparatus for an optical recording medium, which is characterized in that refractive index matching liquid is added to a transparent plate-like member in advance.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A flaw recovering apparatus for recovering a transparent protection layer covering a recording layer of an optical recording medium, the transparent protection layer having a refractive index, the apparatus comprising:

means for applying liquid material to the transparent protection layer, the applied liquid material having a same refractive index as the refractive index of the transparent protection layer, the applied liquid material forming a first layer on the protection layer; and means for adhering a transparent plate member having flexibility on the formed first layer, the transparent plate member forming a second layer on the first layer.

2. The apparatus according to claim 1, wherein the applying means comprises:

a liquid applying roller for applying the liquid material to the protection layer of the optical medium; and a liquid tank for supplying the liquid material to the liquid applying roller.

3. The apparatus according to claim 1, wherein the adhering means comprises:

a plate cassette for containing the transparent plate member; and a plate adhering roller for drawing the transparent plate member from the plate cassette and then applying the transparent plate member to the first layer.

4. The apparatus according to claim 3, wherein the transparent plate member comprises a transparent film.

5. The apparatus according to claim 4, wherein the transparent plate member comprises material selected from polyimide and polyester.

6. The apparatus according to claim 1, wherein the transparent plate member comprises a transparent film made of a material selected from polyimide and polyester.

7. The apparatus according to claim 1, wherein a thickness of the optical recording medium, on which the first layer and the second layer are added, is 40 μm or less.

8. The apparatus according to claim 1, wherein the transparent plate member holds the liquid material on a part of a surface of the transparent plate member prior to overlaying the protection layer by means of the adhering means.

9. The apparatus according to claim 1, further comprising a data processor for at least one of (i) recording data on the transparent protection layer, and (ii) reproducing data from the transparent protection layer.

10. The apparatus according to claim 9, wherein said data processor comprises:

an optical system for introducing a light beam to said optical recording medium and extracting reflected light from said optical recording medium; and means for converting said reflected light to an electrical signal.

11. The apparatus according to claim 1, further comprising:

a card drive system having a pulley and a belt reciprocating through the pulley;

a card mount base set on said belt; and an optical system for recording/reproducing optical recording data on said optical recording medium.

12. The apparatus according to claim 1, wherein said applying means applies said first layer such that said first layer has a substantially uniform thickness throughout.

13. The apparatus according to claim 12, wherein said second layer has a substantially uniform thickness throughout.

14. The apparatus according to claim 1, wherein said second layer has a substantially uniform thickness throughout.

15. A card reissuing apparatus for use with an optical recording medium having a refractive index, the card reissuing apparatus comprising:

means for applying a liquid material for matching a refractive index onto a recording surface of the optical recording medium to form a first layer, said first layer having a same refractive index as the refractive index of the optical recording medium;

means for adhering a transparent liquid member having flexibility on said first layer to form a second layer;

reproducing means for reproducing data from the optical recording medium having said first and second layers thereon; and recording means for recording said reproduced data to an optical recording medium different from said first-mentioned optical recording medium.

16. The apparatus according to claim 15, further comprising liquid removing means for removing liquid material from said optical recording medium.

17. The apparatus according to claim 16, wherein said liquid removing means comprises:

blotting paper for absorbing liquid material from the optical recording medium;

a paper bobbin for feeding said blotting paper to the optical recording medium; and a blotting paper collecting bobbin for winding said blotting paper.

18. The apparatus according to claim 15, wherein said applying means applies said first layer such that said first layer has a substantially uniform thickness throughout.

19. The apparatus according to claim 18, wherein said second layer has a substantially uniform thickness throughout.

20. The apparatus according to claim 15, wherein said second layer has a substantially uniform thickness throughout.

21. An apparatus for recovering a flaw of an optical recording medium having a first transparent protection layer on an optical recording layer having data recorded, the first transparent protection layer having a refractive index, the apparatus comprising:

refractive index matching layer forming means for forming a refractive index matching layer having a same refractive index as the refractive index of the first transparent protection layer of the optical recording medium, on the first transparent protection layer; and second transparent protection layer forming means for forming a second transparent protection layer on the refractive index matching layer.

22. The apparatus according to claim 21, wherein said applying means applies said refractive index matching layer such that said first layer has a substantially uniform thickness throughout.

23. The apparatus according to claim 22, wherein said second transparent protection layer has a substantially uniform thickness throughout.

24. The apparatus according to claim 21, wherein said second transparent protection layer has a substantially uniform thickness throughout.

* * * * *